United States Patent
Takemura et al.

(10) Patent No.: US 8,827,566 B2
(45) Date of Patent: Sep. 9, 2014

(54) THRUST ROLLER BEARING WITH RACES

(75) Inventors: Hiromichi Takemura, Gunma (JP);
Yutaka Kondou, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/824,774

(22) PCT Filed: Aug. 28, 2012

(86) PCT No.: PCT/JP2012/071672
§ 371 (c)(1),
(2), (4) Date: May 30, 2013

(87) PCT Pub. No.: WO2013/042512
PCT Pub. Date: Mar. 28, 2013

(65) Prior Publication Data
US 2014/0147071 A1    May 29, 2014

(30) Foreign Application Priority Data

Sep. 20, 2011    (JP) ................................ 2011-204206
Aug. 23, 2012    (JP) ................................ 2012-183813

(51) Int. Cl.
*F16C 33/46*      (2006.01)
*F16C 33/58*      (2006.01)

(52) U.S. Cl.
USPC ........................................................ 384/621

(58) Field of Classification Search
CPC ........ F16C 19/30; F16C 19/305; F16C 19/32; F16C 43/08
USPC ................................................ 384/618–623
See application file for complete search history.

(56) References Cited

FOREIGN PATENT DOCUMENTS

| JP | 1-67328 | 4/1989 |
|----|---------|--------|
| JP | 2-033924 | 3/1990 |
| JP | 11-247868 A | 9/1999 |
| JP | 2000-266043 A | 9/2000 |
| JP | 2004-028342 A | 1/2004 |
| JP | 2004-116663 A | 4/2004 |
| JP | 2005-164023 A | 6/2005 |
| JP | 2006-207618 A | 8/2006 |
| JP | 2008-25771 A | 2/2008 |
| JP | 2008-39031 A | 2/2008 |
| JP | 2010-43681 A | 2/2010 |
| JP | 2010-159789 A | 7/2010 |

OTHER PUBLICATIONS

International Search Report dated Oct. 16, 2012 from the corresponding PCT/JP2012/071672.

*Primary Examiner* — Phillip A Johnson
(74) *Attorney, Agent, or Firm* — Katten Muchin Rosenman LLP

(57) ABSTRACT

Construction of a thrust roller bearing with races is achieved in which a function of preventing a cage 3, first thrust race 4a and second thrust race 5a from separating from each other can be maintained, the amount of eccentricity that is allowed between a pair of members that rotate relative to each other can be increased, and the amount of lubricant that can flow inside the bearing can be increased. The outer diameter of the outer-diameter side flange 8a that is formed around the outer circumferential edge section of the first thrust race 4a is 60 mm to 120 mm, the inner diameter of the inner-diameter side flange 11a that is formed around the inner-circumferential edge section of the inner-diameter side flange 5a is 40 mm to 80 mm, and the internal gap is 1 mm to 2 mm. Therefore, outer-diameter side locking sections 9a are intermittently formed in the circumferential direction on the tip-end edge of the outer-diameter side flange 8a.

5 Claims, 9 Drawing Sheets

(A)

(B)

(C)

THRUST ROLLER BEARING WITH RACES

TECHNICAL FIELD

The present invention relates to a thrust roller bearing with races including a thrust needle bearing with races that is assembled in the rotational support section of various kinds of rotary machinery such as the transmission of an automobile, and supports a thrust load that is applied to this rotational support section.

BACKGROUND ART

A thrust roller bearing such as disclosed in JP 2005-164023 (A) is installed in rotational support sections of various kinds of rotary machinery such as the transmission of an automobile, and while supporting thrust loads that are applied between a rotating member, such as a rotating shaft, and a stationary member, such as a casing, allows the rotating member to rotate. Moreover, in the case where a pair of members that rotate relative to each other by way of this kind of thrust roller bearing are made of a material, the required hardness of which is difficult to maintain, or in the case where processing the material to a required smoothness is difficult or troublesome, a thrust roller bearing with races that combines one cage and a plurality of rollers with two races is used.

FIG. 7 illustrates an example of a conventionally known thrust roller bearing with races 1. This thrust bearing with races 1 has a plurality of rollers 2 that are arranged in a radial direction, a cage 3 that holds these rollers 2, and a first thrust race 4 and second thrust race 5 that hold the cage 3 from both sides in the axial direction. The cage 3 is formed completely in a circular ring shape, and the same number of pockets 6 as the rollers 2 is provided in the cage 3 so as to be radially arranged at regular intervals in the circumferential direction.

Moreover, the first thrust race 4 and second thrust race 5 are both made using a sufficiently hard metal plate such as bearing steel or case hardening steel, and formed by punching and bending with a press. Typically, the first thrust race 4, which is called as an outer race, has a flat, circular ring-shaped first thrust race section 7, and a cylindrical-shaped outer-diameter side flange 8 that is provided so as to be bent to one side in the axial direction from the outer circumferential edge of the first thrust race section 7. An outer-diameter side locking section 9 that is bent inward in the radial direction is provided on the tip-end edge of the outer-diameter side flange 8. On the other hand, the second thrust race 5, which is typically called an inner race, has a flat, circular ring-shaped second thrust race section 10, and a cylindrical-shaped inner-diameter flange 11 that is provided so as to be bent to one side in the axial direction from the inner-circumferential edge of the second thrust race section 10. An inner-diameter side locking section 12 that is bent outward in the radial direction is provided on the tip-end edge of the inner-diameter side flange 11.

The inner diameter of the outer-diameter side flange 8 is larger than the outer diameter of the cage 3, the outer diameter of the inner-diameter side flange 11 is smaller than the inner diameter of the cage 3, and the cage 3 can be placed between the outer-diameter side flange 8 and inner-diameter side flange 11 so as to be able to rotate relative to the first thrust race 4 and second thrust race 5. The diameter of the inscribed circle of the outer-diameter side locking section 9 is a little smaller than the outer diameter of the cage 3, and the diameter of the circumscribed circle of the inner-diameter side locking section 12 is a little larger than the inner diameter of this cage 3. The cage 3 that holds the roller 2 is combined with the first thrust race 4 and second thrust race 5 while elastically deforming the outer-diameter side flange 8 and inner-diameter side flange 11, and after being combined, these members are capable of relative rotation, and are prevented from accidentally separating from each other. In the example in the figure, it is taken into consideration that the first thrust race 4 is mounted on a ferrous alloy member having high hardness and the second thrust race 5 is mounted on an aluminum alloy member having low hardness. Therefore, the thickness dimension of the second thrust race 5 is greater than the thickness dimension of the first thrust race 4.

The thrust roller bearing with races 1 that is constructed in this way, as illustrated in FIG. 8, is mounted in the rotational support section where thrust loads occur with the outer-diameter side flange 8 that is formed around the outer-circumferential edge of the first thrust race 4 fitted inside a support section 14 that is formed in the casing 13. Moreover, the second thrust race 5 comes in contact with the end surface of an opposing member 15. In this state, this opposing member 15 is supported by the casing 13 so as to be able to freely rotate. The thrust roller bearing with races 1 supports the thrust load that is applied between the opposing member 15 and the casing 13. It is desired that in this kind of thrust roller bearing with races 1, the following functions (1) to (4) should all be achieved to a high degree as much as possible.

(1) The cage 3, first thrust race 4 and second thrust race 5 should not accidentally separate.

This function is necessary in order to prevent not being able to obtain the original performance of the thrust roller bearing with races 1, and to prevent the assembly work of a transmission or the like from becoming troublesome due to these members becoming separated from the time of transport from the factory where the thrust roller bearing with races 1 is manufactured to the assembly factory of the transmission or the like until the time when assembled in a specified portion.

(2) During operation of a transmission or the like, it should be possible to maintain the amount of flow of lubricant (lubricant flow amount) that flows in the internal space between the first thrust race 4 and second thrust race 5 where the cage 3 and rollers 2 are located.

This function is required in order to maintain the strength of the oil film that is formed in the areas of rolling contact between the rolling surfaces of the rollers 2 and the first thrust race section 7 and second thrust race section 10 during operation of the transmission or the like, as well as to effectively cool those areas of rolling contact.

(3) Relative rotation of the cage 3 to the first thrust race 4 and second thrust race 5 should be assured even when the centers of rotation of the first thrust race 4 and second thrust race 5 are shifted a little (i.e. when the operation of these thrust races is a little eccentric).

This function is necessary in order to maintain the functions of the thrust roller bearing with races 1 even when, due to manufacturing error or assembly error of the thrust roller bearing with races 1, the transmission or the like, the centers of rotation of the first thrust race 4 and second thrust race 5 are shifted a little.

(4) The thrust roller bearing with races 1 should be able to be assembled in only a specified direction with respect to the casing 13 (i.e. should not be able to be assembled in the reverse direction).

This function is necessary in order to prevent the occurrence of damage such as burning of the thrust roller bearing with races 1 due to the flow path for the lubricant becoming blocked because the thrust roller bearing with races 1 is assembled in the reverse direction.

In the case of the conventional construction, it is difficult to achieve all of the functions given in (1) to (4) above to a high degree, so there is a disadvantage in attempting to improve the function of various machines in which this kind of thrust roller bearing with races is assembled. This will be explained below.

In order to achieve the functions (1) and (2) to a high degree, it is necessary to widen the space that exists between the outer-diameter side flange 8 and inner-diameter side flange 11 and both the inside and outside circumferential surfaces of the cage while at the same time increasing the engagement amount between the outer-diameter side locking section 9 and inner-diameter side locking section 12 and the circumferential edge of the cage 3. However, taking into consideration the ease of assembling the first thrust race 4, second thrust race 5 and cage 3, it is not possible to increase the engagement amount in excess. For example, when assembling the cage 3 and first thrust race 4, the outer circumferential edge section of the cage 3 is placed on the outer-diameter side locking section 9 while at the same time elastically deforming the outer-diameter side flange 8 outward in the radial direction such as illustrated in FIGS. 9A→9B→9C. This work becomes difficult when the protruding amount δ that the outer-diameter side locking section 9 protrudes from the inner circumferential surface of the outer-diameter side flange 8 becomes too large.

As the outer-diameter side locking section 9, there is so-called full curl construction that is obtained by bending the tip-end edge section of the outer-diameter side flange 8 inward in the radial direction around the entire circumference, and there is so-called partial curl construction that is obtained by bending the tip-end edge of the outer-diameter side flange 8 inward in the radial direction at a plurality of locations that are spaced intermittently in the circumferential direction. In the case of full curl construction, the cage 3 will not be able to assembled inside the outer-diameter side flange 8 unless the protruding amount δ is made considerably small, or the outer diameter of the cage 3 is made considerably less than the inner diameter of the outer-diameter side flange 8 in case of maintaining this protruding amount δ. However, making the outer diameter of the cage 3 too much smaller than the inner diameter of the outer-diameter side flange 8 is not preferable from the aspect of maintaining the ability to position the cage 3 in the radial direction with respect to the first thrust race 4 (i.e. suppressing run-out in the radial direction of the cage 3). Therefore, in the case of employing full curl construction, it is necessary to make the protruding amount δ small. In the case of using full curl construction of the outer-diameter side locking section 9 in a thrust roller bearing with races 1 having the outer diameter of the outer-diameter side flange of 60 mm to 120 mm and the inner diameter of the inner-diameter side flange of 40 mm to 80 mm, which is a subject of the present invention, when the protruding amount δ is greater than 0.4 mm, it becomes difficult to assemble the cage 3 inside the outer-diameter side flange 8.

On the other hand, when partial curl construction is employed, it is possible to increase the amount of elastic deformation of the outer-diameter side flange 8 (i.e. increase the range of elastic deformation) when assembling the cage 3 inside the outer-diameter side flange 8. Therefore, even though the protruding amount δ of the outer-diameter side locking section 9 is made large, and the difference between the outer diameter of the cage 3 and the inner diameter of the outer-diameter side flange 8 is made somewhat small, the cage 3 can be assembled inside the outer-diameter side flange 8 with no particular problem. When outer-diameter side locking sections having partial curl construction are formed at a plurality of locations in the circumferential direction of the tip-end edge of the outer-diameter side flange as disclosed and illustrated in FIG. 3 and FIG. 4 of JP 2008-039031 (A), and of this outer-diameter side flange, the height dimension in the axial direction of the portion between adjacent outer-diameter side locking sections in the circumferential direction is made small, the area of the opening of the internal space between the first thrust race and second thrust race where the cage and rollers are located is made large, and thus it is possible to maintain the amount of lubricant flow and achieve functions (1) and (2) above.

However, even in the construction disclosed and illustrated in FIG. 3 and FIG. 4 of JP 2008-039031 (A), it is not possible to achieve functions (3) and (4). For example, in order to obtain function (3), it is necessary for construction to allow a certain amount (i.e. an appropriate amount, not an excessive amount) of relative displacement in the radial direction between the first thrust race 4 and second thrust race 5 of the thrust roller bearing with races 1. In other words, with the first thrust race 4 and second thrust race 5 supported by a pair of members so as to be able to rotate relative to each other, the races will rotate together with these members. Therefore, when the centers of rotation of these members shift in the radial direction, the first thrust race 4 and second thrust race 5 will have a whirling motion with respect to each other. As illustrated in FIG. 10, as the radius (eccentricity) of this whirling motion becomes large, part of the cage 3 is strongly held between the inner circumferential surface of the outer-diameter side flange 8 and the outer circumferential surface of the inner-diameter side flange 11 ("wedging" of the cage occurs). As a result, a large radial load is applied to part of the cage 3, and it becomes easy for damage such as breaking or cracking of the cage 3 to occur. Moreover, the cage 3 stops rotating, and revolution and rotation of the rollers 2 becomes impossible, and thus the rolling surfaces of the roller 2 rub against or is in sliding contact with the first thrust race surface 17 of the first thrust race section 7 and the second thrust race surface 20 of the second thrust race section 10, and thus in the thrust roller bearing with races 1, burning occurs in the areas of contact between the first thrust race surface 17 and second thrust race surface 20 and the rolling surfaces of the rollers 2, or severe damage such as damage to the cage 3 occurs.

In the case of the thrust roller bearing with races 1 having the outer diameter of the outer-diameter side flange of 60 mm to 120 mm and the inner diameter of the inner-diameter side flange of 40 mm to 80 mm, which is a subject of the present invention, when full curl construction is employed for the outer-diameter side locking section 9, and the inner-diameter side of this outer-diameter side locking section can pass the cage 3, then as described above, the amount of protrusion in the radial direction of this outer-diameter side locking section 9 must be kept to about 0.4 mm. Under this condition, when the internal space in the thrust roller bearing with races 1 stops at about 0.6 mm to 1.6 mm, and shifting in the radial direction of the centers of rotation of these members (i.e. radius of the whirling motion) exceeds 0.5 mm, the possibility that damage such as described above will occur increases. JP 2008-039031 (A) does not disclose construction for preventing such damage.

Moreover, when assembling the thrust roller bearing with races 1 between the casing 13 and opposing member 15, when a mistake is made in the assembly direction, there is a possibility that durability will become poor due to poor lubrication, and sufficient performance of the thrust roller bearing with races 1 will not be able to be obtained. In other words, the thrust roller bearing with races 1 can be assembled in the casing 13 in a direction opposite the proper state illustrated in FIG. 8 (i.e. in an improper state). However, when assembled in the improper state, the first thrust race 4 blocks the space 16 between the casing 13 and the opposing member 15, impairing the flow of lubricant to the inside of the thrust roller bearing with races 1.

As construction for preventing such problems due to assembly in the reverse direction, construction is disclosed and illustrated in FIG. 11 and FIG. 12 of JP 2004-028342 (A) in which the outer diameter of the second thrust race section of the second thrust race is larger than the outer diameter of the outer-diameter side flange of the first thrust race. With this kind of construction, the second thrust race cannot be inserted inside the support section of the casing, so the second thrust race can be prevented from being assembled in the wrong direction in the support section of the casing. In other words, only the first thrust race that is supposed to fit inside this support section can be assembled, so reverse assembly can be prevented. However, in the case of this kind of conventional construction, the section of the second thrust race that is near the outer circumferential edge and that protrudes outward in the radial direction further than the outer circumferential surface of the outer-diameter side flange blocks the opening on the outer-diameter side of the internal space of the thrust roller bearing with races, which reduces the amount of flow of lubricant, so the function (2) is impaired.

As can be understood from the explanation above, in the case of conventional construction, it is difficult to achieve together all of the functions (1) to (4) at a high degree. The related literature mentioned above is incorporated into this specification as a reference.

RELATED LITERATURE

Patent Literature

[Patent Literature 1] JP 2005-164023 (A)
[Patent Literature 2] JP 2008-039031 (A)
[Patent Literature 3] JP 2004-028342 (A)

SUMMARY OF THE INVENTION

Problem to be Solved by the Invention

In consideration of the conditions described above, the object of the present invention is to achieve construction of a thrust roller bearing with races that is easy to handle and is capable of maintaining a stable operating state even under extreme operating conditions, by increasing the amount of eccentricity that is allowed for a pair of members that rotate relative to each other while maintaining a function of preventing a cage and a pair of thrust races from becoming separated, and by increasing the amount of lubricant that flows inside.

Means for Solving the Problems

The thrust roller bearing with races of the present invention has a cage, a plurality of rollers, a first thrust race, and a second thrust race. The cage is circular ring shaped and has pockets that are long in the radial direction formed at a plurality of locations in the circumferential direction thereof. Moreover, the rollers are arranged in the pockets so as to be able to roll freely. Furthermore, the first thrust race and second thrust race are combined so as to be able to rotate relative to the cage and so as not to be able to separate, and are each formed by bending a hard metal plate.

The first thrust race has: a first thrust race section that has a flat circular ring shape; a cylindrical outer-diameter side flange that is formed by bending the outer circumferential edge of the first thrust race toward one side in the axial direction; and outer-diameter side locking sections that are formed at a plurality of locations in the circumferential direction of the tip-end edge of the outer-diameter side flange, and protrude toward the inside in the radial direction from the tip-end edge of the outer-diameter side flange. Moreover, the height dimension in the axial direction of the outer-diameter side flange in portions where the outer-diameter side locking sections are not formed is less than portions where the outer-diameter side locking sections are formed. Furthermore, the outer diameter of the outer-diameter side flange is 60 mm to 120 mm.

On the other hand, the second thrust race has: a second thrust race section that has a flat circular ring shape; a cylindrical inner-diameter side flange that is formed by bending the inner circumferential edge of the second thrust race toward one side in the axial direction; and inner-diameter side locking sections that are formed at a plurality of locations in the circumferential direction of the tip-end edge of the inner-diameter side flange, and protrude toward the outside in the radial direction from the tip-end edge of the inner-diameter side flange. The inner diameter of the inner-diameter side flange is 40 mm to 80 mm.

Particularly, in the thrust roller bearing with races of the present invention, internal gap is within the range of 1 mm to 2 mm. Here, this internal gap means the dimensions in which the first thrust race and the second thrust race can relatively displace in the radial direction, and is expressed in the sum of the dimensions in the radial direction of the ring-shaped gaps that exist between the inner circumferential surface of the outer-diameter side flange and the outer circumferential surface of the cage and between the outer circumferential surface of the inner-diameter side flange and the inner circumferential surfaces of the cage, with the outer-diameter side flange, the inner-diameter side flange and the cage concentrically arranged.

Preferably, the cage is entirely formed into a hollow ring shape by combining together a first cage element and second cage element. Moreover, of these cage elements, the first cage element, which is located on the first thrust race section side, is formed by forming a first inner-diameter side fitting cylindrical section and first outer-diameter side fitting cylindrical section that are bent at a right angles in the same axial direction as each other from both the inner and outer circumferential edges of a circular ring-shaped first flat plate section. On the other hand, the second cage element, which is located on the second thrust race section side, is formed by forming a second inner-diameter side fitting cylindrical section and second outer-diameter side fitting cylindrical section that are bent at a right angles in the same axial direction as each other from both the inner and outer circumferential edges of a circular ring-shaped second flat plate section. The first cage element and second cage element are combined together by fitting the first inner-diameter side fitting cylindrical section into the second inner-diameter side fitting cylindrical section, and fitting the first outer-diameter side fitting cylindrical section onto the second outer-diameter side fitting cylindrical section. Furthermore, the diameter of the second outer-diameter side fitting cylindrical section is larger on the tip-end half section that is on the far side from the second flat plate section than on the base half section that is near the second flat plate section, and the first outer-diameter side fitting cylindrical section fits onto the tip-end half section of the second outer-diameter side fitting cylindrical section.

Moreover, preferably the second thrust race has a circular-ring shaped second thrust race section (i.e. main thrust race) and at least one protrusion that is formed so as to protrude outward in the radial direction from part of the outer circumferential edge of the second thrust race section. The outer diameter of the second thrust race section is less than the inner diameter of the outer-diameter side flange, and the diameter of the circumscribed circle of the second thrust race that includes the protrusions is larger than the outer diameter of the outer-diameter side flange.

In this case, even more preferably, the thickness dimension of the protrusions is less than the thickness dimension of the second thrust race section. A stepped section is formed at the boundary section between one surface of the protrusions that faces the tip-end edge of the outer-diameter side flange and the race surface of the second thrust race section that comes in rolling contact with the rollers.

In this case, more preferably, the protrusions are formed at a plurality of locations that are evenly spaced around the outer circumferential edge of the second thrust race section.

Effect of the Invention

With the thrust roller bearing with races of the present invention, it is possible to achieve all of the functions (1) to (4) described above together to a high degree. More specifically, by increasing the amount of eccentricity that is allowed for a pair of members that rotate relative to each other while maintaining a function of preventing separation of the cage and pair of thrust races, and by increasing the amount of lubricant that flows inside, the thrust roller bearing with races that is easy to handle and is capable of maintaining a stable operating state even under extreme operating conditions can be achieved.

The function (1) of preventing separation is made possible by combining the cage and the first thrust race so as not to separate with the engagement of the outer-diameter side locking sections and the outer circumferential edge of the cage, and by combining the cage and second thrust race so as not to separate with the engagement of the inner-diameter side locking sections and the inner circumferential edge of the cage.

In order to combine these thrust races and the cage so as not to separate in this way, the outer-diameter side locking sections and inner-diameter side locking sections that are formed on the tip-end edges of both the outer-diameter side flange and inner-side diameter side flange are intermittently formed at a plurality of locations in the circumferential direction of the tip-end edges of the flanges. Therefore, it is possible to combine the first thrust race, second thrust race and cage even when the amount of protrusion in the radial direction of the outer-diameter side locking sections and inner-diameter side locking sections is large. Moreover, even when the difference between the inner diameter of the outer-diameter side flange and the outer diameter of the cage, and the difference between the outer diameter of the inner-diameter side flange and the inner diameter of the cage is increased to some extent, by the amount that it is possible to increase the amount of protrusion in the radial direction of the outer-diameter side locking sections and inner-diameter side locking sections, the function of preventing separation of the cage, first thrust race and second thrust race is sufficiently carried out. As a result, it is possible to employ a comparatively large value of 1 mm to 2 mm as the internal gap of the thrust roller bearing with races.

By adopting a large value for the internal gap, the thrust roller bearing with races is able to assure relative rotation of the cage with respect to the thrust races even when there is a little whirling motion of the first thrust race and second thrust race. In other words, the internal gap is large, so even when the gap between the inner circumferential surface of the outer-diameter side flange and the outer circumferential surface of the inner-diameter side flange becomes narrow in part in the circumferential direction due to whirling motion, the gap in the portion can be maintained at a value larger than the width in the radial direction of the cage. As a result, even when the centers of rotation of the first thrust race and the second thrust race are shifted a little, it is possible to obtain the function (3) of assuring the relative rotation of the cage with respect to the thrust races.

Moreover, by using a comparatively large value for the internal gap, and by making the height dimension in the axial direction in portions of the outer-diameter side flange where the outer-diameter side locking sections are not formed, it is possible to maintain the amount of lubricant that flows into the internal space. In other words, by reducing part of the height dimension of the outer-diameter side flange, it is possible to make it easier for lubricant to pass this outer-diameter side flange in the radial direction. Moreover, by increasing the internal gap, it is possible for the lubricant to easily pass between both the inner and outer circumferential edge of the cage and the inner circumferential surface of the outer-diameter side flange and outer circumferential surface of the inner-diameter side flange. As a result, it is possible to achieve at a high degree the function (2) for maintaining the amount of flow of lubricant in the thrust roller bearing with races during operation.

Moreover, in the case where a first outer-diameter side fitting cylindrical section that is formed around the outer circumferential edge of the first cage element of the cage is fitted onto a second outer-diameter side fitting cylindrical section that is formed around the outer circumference edge of the second cage element only at the tip-end half section of this second outer-diameter side fitting cylindrical section, it is possible to more easily achieve both maintaining engagement between the outer circumferential edge of the cage and the outer-diameter side locking section, and preventing rubbing between the outer circumferential edge of the cage and the outer-diameter side locking sections.

Furthermore, by forming protrusions around the outer circumferential edge of the second thrust race section of the second thrust race, it is possible to achieve the function (4) of preventing the thrust roller bearing with races from being assembled in the rotational support section in the reverse direction. The width in the circumferential direction of the protrusions is limited, so the protrusions impair the flow of lubricant in the internal space very little, and even when there is a function for preventing reverse assembly, the function (2) of maintaining the flow of lubricant is impaired hardly at all. Particularly, by making the thickness dimension of the protrusions small, it is possible to sufficiently increase the gap between one surface of the protrusions and the tip-end edge of the outer-diameter side flange, and thus it is possible to further reduce the amount that the protrusions obstruct the flow of lubricant.

MODES FOR CARRYING OUT THE INVENTION

First Example

Figure 1:
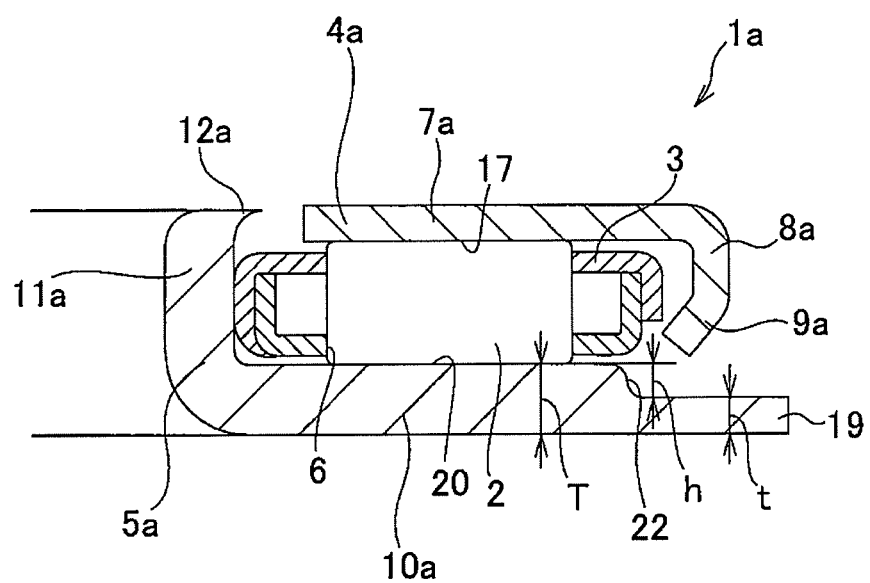
FIG. 1 is a partial cross-sectional drawing illustrating a first example of an embodiment of the present invention.
Figure 2:
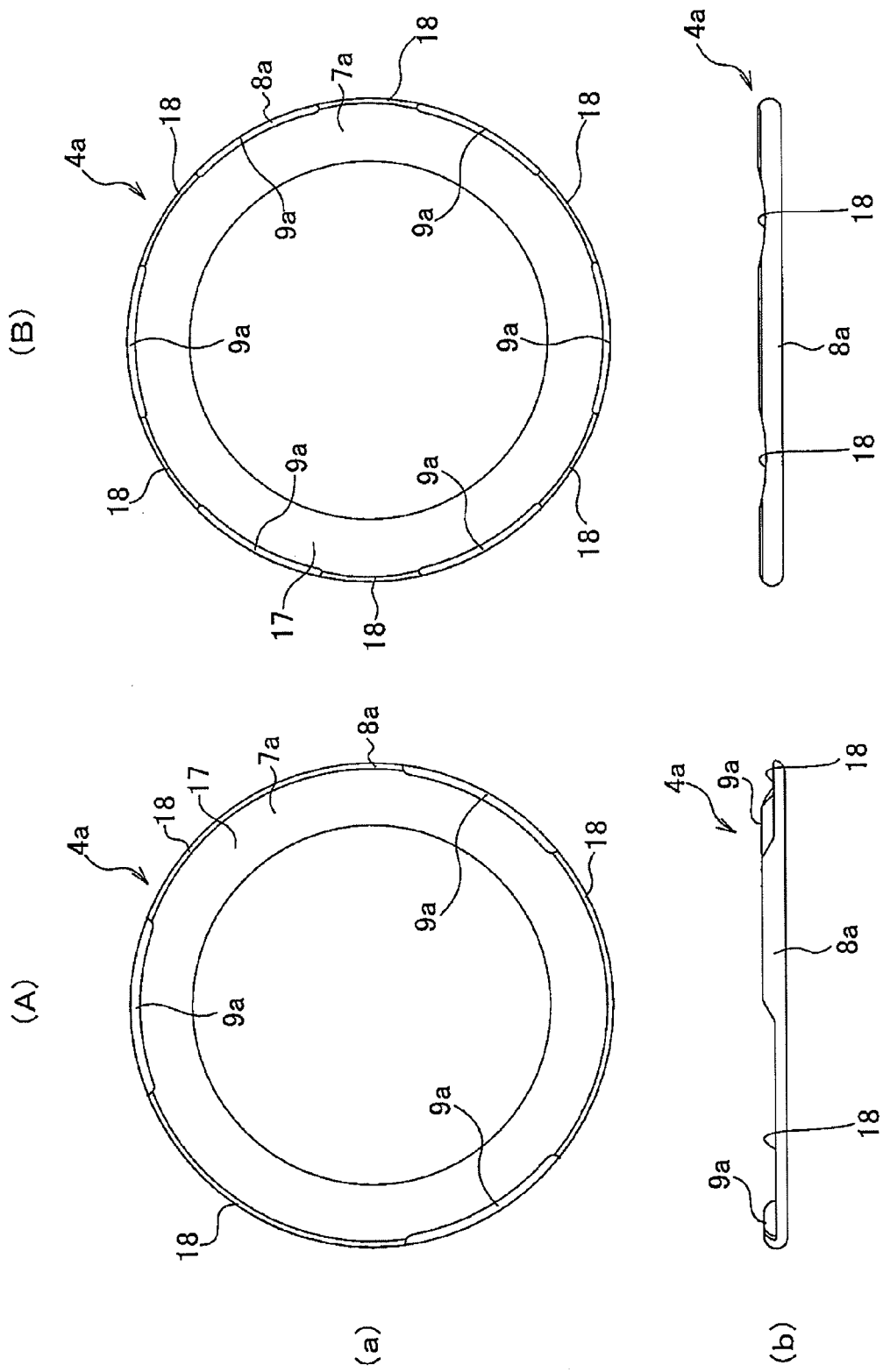
FIG. 2A and FIG. 2B illustrate two examples of shapes of a first thrust race, where of these drawings, the section (a) shows them as seen from below in FIG. 1, and the section (b) shows them as seen in the radial direction.
Figure 3:
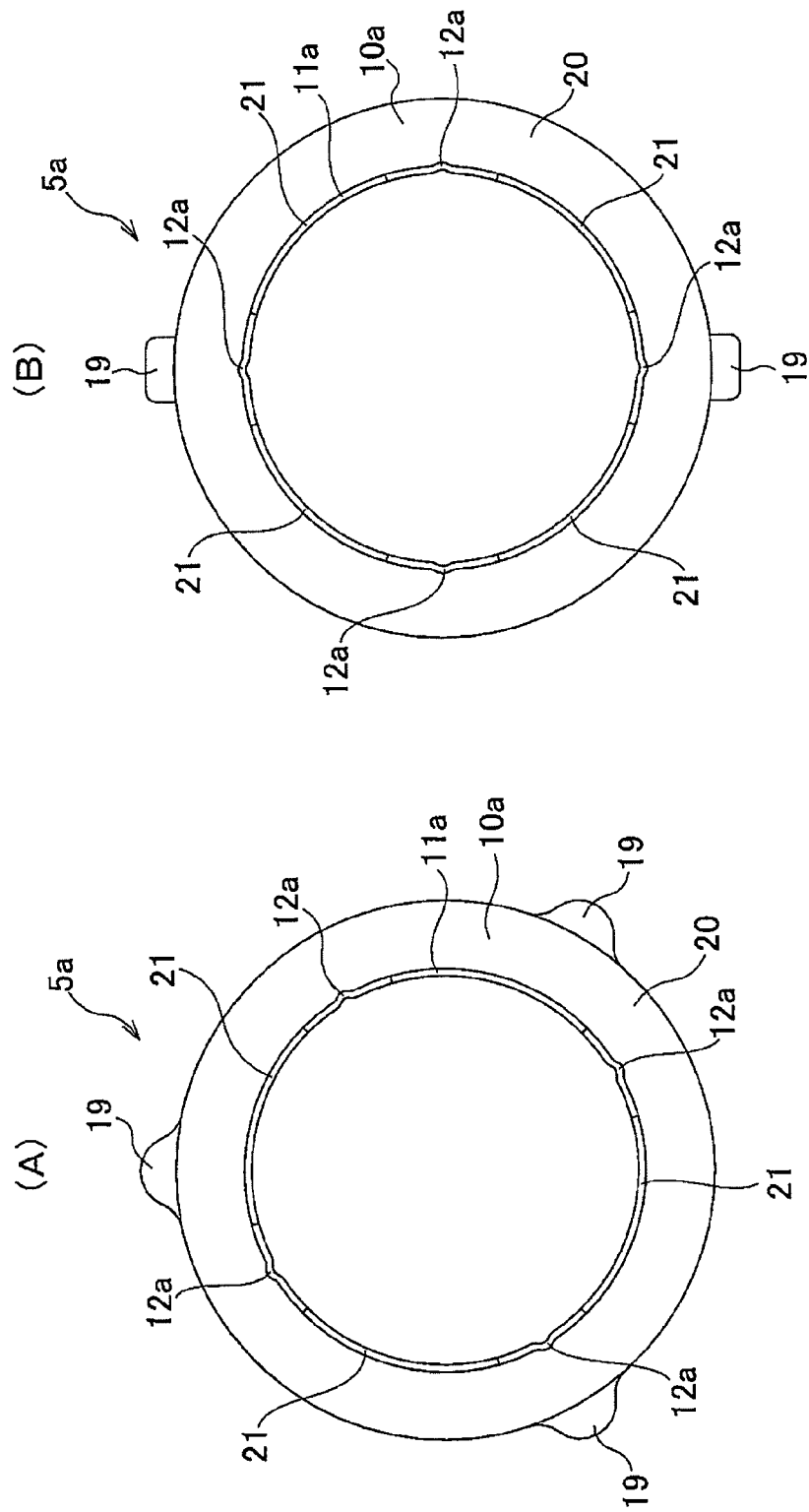
FIG. 3A and FIG. 3B illustrate two examples of shapes of a second thrust race as seen from above in FIG. 1.

FIG. 1 to FIG. 3 illustrates a first example of an embodiment of the present invention. The thrust roller bearing with races 1a of this example has a cage 3, a plurality of rollers 2, a first thrust race 4a and a second thrust race 5a. The construction of the cage 3 and rollers 2 is similar to the conventional construction illustrated in FIG. 7, so the same reference numbers are given to equivalent parts, and any redundant explanation is omitted. Moreover, that the first thrust race 4a and second thrust race 5a are formed by bending hard metal such that the races can rotate freely relative to the cage 3 and do not separate from each other is also the same as in the conventional construction.

The first thrust race 4a has a first thrust race section 7a, an outer-diameter side flange 8a, and a plurality (three in the construction illustrated in FIG. 2A, and six in the construction of FIG. 2B) of outer-diameter side locking sections 9a. The first thrust race section 7a has a flat and circular ring shape, and one side in the axial direction (bottom side in FIG. 1) thereof functions as a first thrust race surface 17. Moreover, the outer-diameter side flange 8a has a short cylindrical shape and is formed so as to be bent from the outer circumferential edge of the first thrust race section 7a at nearly a right angle toward the one side in the axial direction where the first thrust race surface 17 is provided (bottom side in FIG. 1).

The outer-diameter side locking sections 9a are formed so as to protrude toward the inside in the radial direction from the tip-end edge of the outer-diameter side flange 8a by bending part of the tip-end edge of the outer-diameter side flange 8a at a plurality of locations (three locations in the construction illustrated in FIG. 2A, and six locations in the construction illustrated in FIG. 2B) that are evenly spaced in the circumferential direction, and are bent at an angle less than 90°. The diameter of the inscribed circle of the outer-diameter side locking sections 9a is a little less than (about 1 mm to 2 mm less than) the outer diameter of the cage 3.

Furthermore, notches 18 are formed in the remaining part on the tip-end edge of the outer-diameter side flange 8a in portions between outer-diameter side locking sections 9a that are adjacent in the circumferential direction. Due to the existence of these notches 18, the height dimension in the axial direction of the outer-diameter side flange 8a in portions where the outer-diameter side locking sections 9a are not formed is less than the height dimension in portions where the outer-diameter side locking sections 9a are formed. The shape of the notches 18 is not particularly specified. The notches 18 can be trapezoidal as illustrated in (b) of FIG. 2A, or can be a circular arc shape as illustrated in (b) of FIG. 2B. The size of the first thrust race 4a is set such that the outer diameter of the outer-diameter side flange 8a is 60 mm to 120 mm.

On the other hand, the second thrust race 5a has a second thrust race section 10a, an inner-diameter side flange 11a, a plurality (four in the example in the figure) of inner-diameter side locking sections 12a, and a plurality (three in the construction illustrated in FIG. 3A, and two in the construction illustrated in FIG. 3B) of protrusions 19. The second thrust race section 10a has a flat and circular ring shape, and one side in the axial direction (top side in FIG. 1) thereof functions as a second thrust race surface 20. Moreover, the inner-diameter side flange 11a has a short cylindrical shape, and is formed by bending from the inner-circumferential edge of the second thrust race section 10 at nearly a right angle toward one side in the axial direction (top side in FIG. 1) where the second thrust race surface 20 is provided.

The inner-diameter side locking sections 12a are formed so as to protrude toward the outside in the radial direction from the tip-end edge of the inner-diameter side flange 11a by bending parts of the tip-end edge of the inner-diameter side flange 11a at a plurality of locations in the circumferential direction (four locations in the example in the figure). In this example, the inner-diameter side locking sections 12a are formed by bending the tip-end edge of the inner-diameter side flange 11a toward the outside in the radial direction so that the shape as seen in the axial direction is nearly a V shape. The shape of these inner-diameter side locking sections 12a is the same as that of the locking sections disclosed and illustrated in FIG. 8a to FIG. 10 of JP 2004-028342 (A), and is a conventionally known shape, so a detailed explanation is omitted. Notches 21 are also formed on the tip-end edge of the inner-diameter side flange 11a in the portions between inner-diameter side locking sections 12a that are adjacent in the circumferential direction, and the height dimension in the axial direction of the inner-diameter side flange 11a in portions where the inner-diameter side locking sections 12a are not formed is less than the height dimension in portions where the inner-diameter side locking sections 12a are formed.

Furthermore, the protrusions 19 are formed so as to protrude outward in the radial direction from the outer circumferential edge of the second thrust race section 10a at a plurality of locations (three locations in the construction in FIG. 3A, and two locations in the construction in FIG. 3B) that are evenly spaced in the circumferential direction of the outer circumferential edge of the second thrust race section 10a. The shape of the protrusions 19 is not particularly specified. The shape can be semicircular as illustrated in FIG. 3A, or can be rectangular as illustrated in FIG. 3B. The thickness dimension t of the protrusions is less than the thickness dimension T of the second thrust race section 10a (t<T). However, on the opposite side from the second thrust race surface 20 (bottom side in FIG. 1), the second thrust race section 10a and the protrusions 19 are on the same plane. Therefore, on the side of the second thrust surface 20, at the boundary between one surface (top surface in FIG. 1) of these protrusions 19 and the second thrust race surface 20, there are stepped sections 22 having a height dimension h (=T−t). Having this kind of shape, the size of the second thrust race 5a is set such that the size of the inner diameter of the inner-diameter side flange is about 40 mm to 80 mm. The outer diameter of the second thrust race section 10 is greater than the diameter of the circumscribed circle of the rollers 2, and less than the inner diameter of the outer-diameter side flange 8a. Moreover, the diameter of the circumscribed circle of the protrusions 19 is greater than the outer diameter of the outer-diameter side flange 8a.

Figure 10:
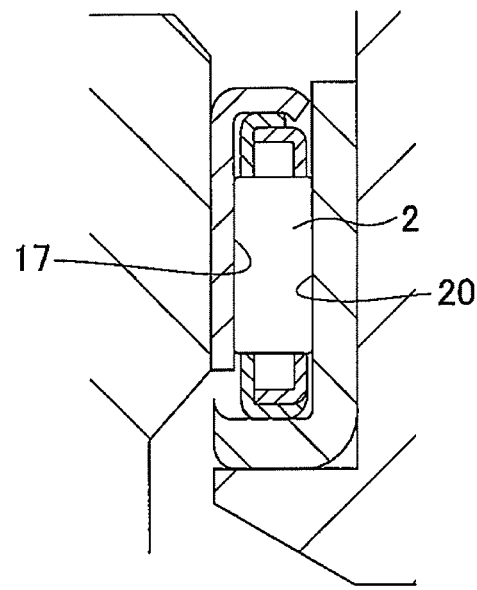
FIG. 10 is a cross-sectional drawing illustrating the state when the cage is held between the outer-diameter side flange and the inner-diameter side flange due to eccentric motion of the first thrust race and second thrust race for the thrust roller bearing with races illustrated in FIG. 7.
Figure 10:
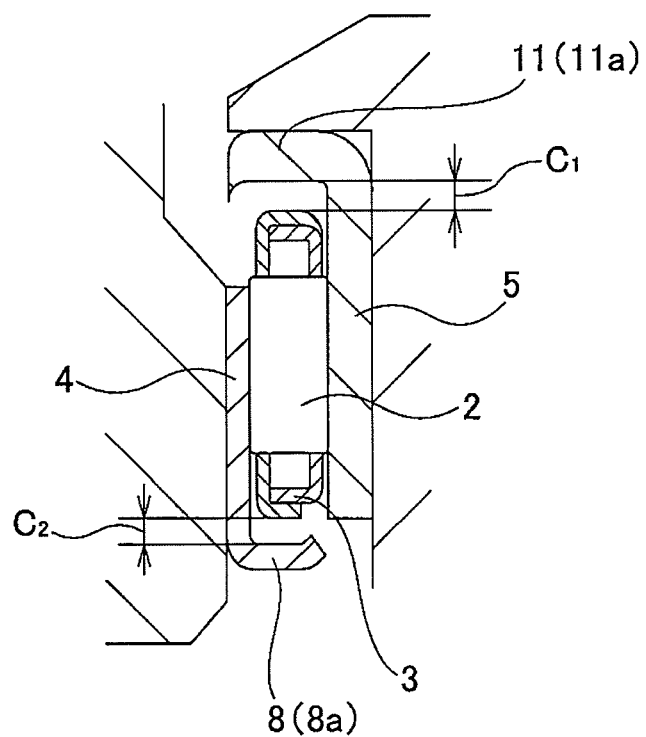

Furthermore, in the thrust roller bearing with races 1a of this example, by properly regulating the outer diameter and inner diameter of the cage 3, the inner diameter of the outer-diameter side flange 8a and the outer diameter of the inner-diameter side flange 11a, the size of the internal gap is made to be 1 mm to 2 mm. This internal gap is the dimension through which the first thrust race 4a and second thrust race 5a can displace relative to each other without elastic deformation of the members of the thrust roller bearing with races 1a. These thrust races become eccentric, and as illustrated in the top portion of FIG. 10, when part in the circumferential direction of the cage 3 is held between circumferential surfaces of the outer-diameter side flange 8a and the inner-diameter side flange 11a, gaps occur between both the inner and outer circumferential surfaces of the cage 3 and the outer circumferential surface of the inner-diameter side flange 11 (11a) and the inner circumferential surface of the outer-diameter side flange 8 (8a) on the opposite side in the radial direction as illustrated in the bottom of FIG. 10. The radial dimensions of these gaps are taken to be $C_1$, $C_2$, and the internal gap becomes $(C_1+C_2)/2$. In other words, in a state where it is presumed that the outer-diameter side flange 8a, inner-diameter side flange 11a and cage 3 are arranged so as to be concentric, a ring-shaped gap having a dimension in radial direction of $c_2$ ($=C_2/2$) occurs between the inner circumferential surface of the outer-diameter side flange 8a and the outer circumferential surface of the cage 3, and a ring-shaped gal having a dimension of $c_1$ ($=C_1/2$) occurs between the outer circumferential surface of the inner-diameter side flange 11a and the inner circumferential surface of the cage 3. The value of the internal gap thus is represented by the sum of the dimensions in the radial direction of these ring-shaped gaps ($c_1+c_2$).

The thrust roller bearing with races 1a of this example is constructed as described above, so it is possible to increase the amount of eccentricity that is allowed for a pair of members that rotate relative to each other with these thrust races supported to these members, while maintaining a function of preventing the cage 3, the first thrust race 4a and the second thrust race 5a from becoming separated, and it is possible to increase the amount of lubricant that flows inside. As a result, it is possible to achieve a thrust roller bearing with races 1a that has good handling characteristics and that can be maintained in a stable operating state even under extreme operating conditions.

First, the function of preventing separation while allowing relative rotation between the members (cage 3, first thrust race 4a, second thrust race 5a) is made possible by combining the cage 3 and first thrust race 4a so as not to be able to separate with the engagement of the outer-diameter side locking sections 9a and the outer circumferential edge of the cage 3, and by combining the cage 3 and second thrust race 5a so as not to be able to separate with the engagement of the inner-diameter side locking sections 12a and the inner circumferential edge of the cage 3. In the case of the thrust roller bearing with races 1a of this example, both the outer-diameter side locking sections 9a and the inner-diameter side locking sections 12 are formed intermittently at a plurality of locations in the circumferential direction around the tip-end edges of the both the outer-diameter side flange 8a and inner-diameter side flange 11a. Therefore, even when the amount of protrusion in the radial direction of the outer-diameter side locking sections 9a and inner-diameter side locking sections 12a is somewhat increased, it is possible to combine the first thrust race 4a, second thrust race 5a and cage 3.

In other words, the bending rigidity of the outer-diameter side flange 8a and the inner-diameter side flange 11a, where the outer-diameter side locking sections 9a and inner-diameter side locking sections 12a are intermittently formed at a plurality of locations in the circumferential direction around the respective tip-end edges, is low compared to that of a flange having full curl construction where locking sections are formed around the entire circumferences, and thus it is easy to pass by the outer circumferential edge section or inner circumferential edge section of the cage 3. Therefore, it is possible to increases the amount of protrusion in the radial direction of the outer-diameter side locking sections 9a and inner-diameter side locking sections 12a. Moreover, even when the difference between the inner diameter of the outer-diameter side flange 8a and the outer diameter of the cage 3, and the difference between the outer diameter inner-diameter side flange 11a and the inner diameter of the cage 3 is increased by the amount that it is possible to increase the amount of protrusion of these locking sections, the function of preventing separation of the cage 3, first thrust race 4a and second thrust race 5a is sufficiently carried out. As a result, it is possible to use a relatively large value of 1 mm to 2 mm for the internal space of the thrust roller bearing with races 1a.

By adopting a large value (1 mm to 2 mm) for the internal gap, the thrust roller bearing with races 1a of this example is able to assure relative rotation of the cage 3 with respect to the thrust races even when there is a little whirling motion (eccentric motion) of the first thrust race 4a and second thrust race 5a. In other words, the internal gap is large, so as illustrated in the top part of FIG. 10, even when the gap between the inner circumferential surface of the outer-diameter side flange 8a and the outer circumferential surface of the inner-diameter side flange 11a becomes narrow in part in the circumferential direction due to whirling motion, the gap in the portion can be maintained at a value larger than the width in the radial direction of the cage 3. Therefore, this part in the circumferential direction of the cage 3 is not strongly held between the inner circumferential surface of the outer-diameter side flange 8a and the outer circumferential surface of the inner-diameter side flange 11a. As a result, even when the centers of rotation of the first thrust race 4a and the second thrust race 5a are shifted a little, it is possible to assure relative rotation of the cage 3 with respect to the thrust races. In other words, in the case of the thrust roller bearing with races 1a of this example, the internal gap can be made large, so even under extreme conditions such as when shift in the centers of rotation between thrust races exceeds 0.6 mm, it is possible to prevent the occurrence of damage such as damage to the cage or burning at the areas of contact between the thrust race surfaces and rolling surfaces of the rollers, such as occurred in conventional construction.

Moreover, by employing a comparatively large value (1 mm to 2 mm) for the internal gap, and by forming notches 18, 21 in portions of the outer-diameter side flange 8a and inner-diameter side flange 1a where the outer-diameter side locking sections 9a and inner-diameter side locking sections 12a are not formed in order to reduce the height dimension in the axial direction of these portions, it is possible to maintain the amount of lubricant that flows into the internal space. In other words, by reducing part of the height dimension of the outer-diameter side flange 8a and inner-diameter side flange 11a, it is possible to increase the area of the opening section of the internal space between the flanges and the circumferential edge section of the cage 3 to be 2 to 10 times that in the conventional construction illustrated in FIG. 7. Moreover, it is possible for lubricant to flow into the internal space, and for the lubricant to smoothly discharge from the internal space, and thus it is possible for the lubricant to easily flow in the radial direction in the internal space. Furthermore, by making the internal space large, the lubricant is able to easily pass through the ring-shaped gaps between the outer and inner circumferential edges of the cage 3 and the inner circumferential surface of the outer-diameter side flange 8a and the outer circumferential surface of the inner-diameter side flange 11a. As a result, it is possible to sufficiently maintain the amount of flow of lubricant in the thrust roller bearing with races 1a during operation, and when compared with the conventional construction illustrated in FIG. 7, the amount of flow of lubricant can be increased 20% or more, for example, can be increased by about 40%, and due to this increase, it is possible to improve the reliability and durability of the thrust roller bearing with races 1a.

Furthermore, in the case of the thrust roller bearing with races 1a of this example, protrusions 19 are formed around the outer circumferential edge of the second thrust race section 10a of the second thrust race 5a. The diameter of the circumscribed circle of these protrusions 19 is larger than the outer diameter of the outer-diameter side flange 8a. Therefore, the first thrust race 4a around which the outer-diameter side flange 8a is formed can fit into the support section 14 of the casing illustrated in FIG. 8, however, the second thrust race 5a around which the protrusions 19 are formed cannot fit into the support section 14. Therefore, it is possible to prevent assembling the thrust roller bearing with races 1a in the wrong direction in the casing of the rotational support section.

The width direction in the circumferential direction of the protrusions is limited, so the protrusions interfere little with the flow of lubricant that flows in the internal space. Therefore, even though there is a function for preventing reverse assembly, it is possible to sufficiently maintain the amount of flow of lubricant. In the case of the thrust roller bearing with races 1a of this example, the thickness dimension t of the protrusions 19 is reduced by making the side of the protrusions that faces the tip-end edge of the outer-diameter side flange 8a concave. Therefore, it is possible to sufficiently increase the gaps between one surface of the protrusions 19 and the tip-end edges of the outer-diameter side flange 8a, and thus further reduce the amount that the protrusions 19 obstruct the flow of lubricant.

Second Example

Figure 4:
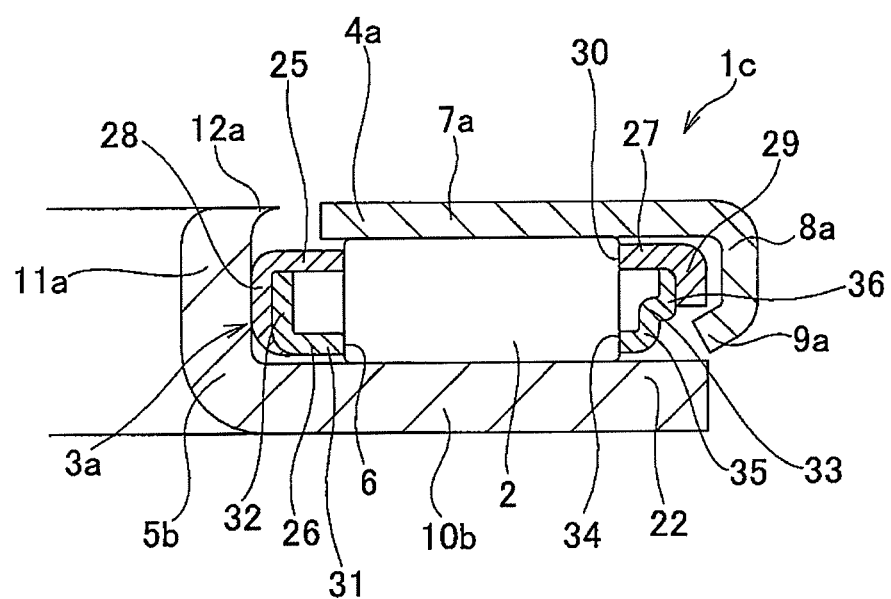
FIG. 4 is a partial cross-sectional drawing illustrating a second example of an embodiment of the present invention.

FIG. 4 illustrates a second example of an embodiment of the present invention. In this example, by devising construction of the cage 3a it becomes easier to maintain the engagement between the outer circumferential edge of the cage 3a and a plurality of outer-diameter side locking sections 9a that are formed around the outer circumferential edge of the first thrust race 4, and prevent rubbing between the outer circumferential edge of the cage 3a and the outer-diameter side locking sections 9a.

The basic construction of the cage 3a itself is the same as in the first example of an embodiment, and by combining a first cage element 35 and a second cage element 26, the cage is formed entirely into a hollow ring shape. The first cage element 25 that is located on the first thrust race section 7a side of the first thrust race 4a has a first flat plate section 27, a first inner-diameter side fitting cylindrical section 28, and a first outer-diameter side fitting cylindrical section 29. The first flat plate section 27 has a circular ring shape with rectangular first through holes 30 that are long in the radial direction and are formed in a radial fashion at a plurality of evenly spaced locations in the circumferential direction. Moreover, the first inner-diameter side fitting cylindrical section 28 and the first outer-diameter side fitting cylindrical section 29 are formed by bending both the inner and outer circumferential edges of the first flat plate section 27 at right angles in the same axial direction as each other. The second cage element 26 that is located on the second thrust race section 10b side of the second thrust race 5b has a second flat plate section 31, a second inner-diameter side fitting cylindrical section 32, and a second outer-diameter side fitting cylindrical section 33. The second flat plate section 31 has a circular ring shape with rectangular second through holes 34 as many as the first through holes 30 that are long in the radial direction and are formed in a radial fashion at a plurality of evenly spaced locations in the circumferential direction. Moreover, the second inner-diameter side fitting cylindrical section 32 and the second outer-diameter side fitting cylindrical section 33 are formed by bending both the inner and outer circumferential edges of the second flat plate section 31 at right angles in the same axial direction as each other, and are bent toward the opposite from the first inner-diameter side fitting cylindrical section 29 and first outer-diameter side fitting cylindrical section 29. Furthermore, this second outer-diameter side fitting cylindrical section 33 has a stepped cylindrical shape in which the diameter of the second outer-diameter side fitting cylindrical section 33 is greater on the tip-end half section 36 on the far side from the second flat plate section 31 than the base half section 35 near the second flat plate section 31.

The first cage element 25 and the second cage element 26 form the cage 3a by being combined together by fitting the first inner-diameter side fitting cylindrical section 28 into the second inner-diameter side fitting cylindrical section 32 with an interference fit, and fitting the first outer-diameter side fitting cylindrical section 29 onto the tip-end half section of the second outer-diameter side fitting cylindrical section 33 with an interference fit. In this case, the first outer-diameter side fitting cylindrical section 29 fits onto the second outer-diameter side fitting cylindrical section 33 only on the tip-end half section 36. Therefore, the height (dimension in the axial direction) of the first outer-diameter side fitting cylindrical section 29 is equal to or less than the height of this tip-end half section 36. The work of combining these cage elements is performed by aligning the phase of the first through holes 30 that are formed in the first flat plate section 27 of the first cage element 25 and the second through holes 34 that are formed in the second flat plate section 31 of the second cage element 26, and with roller 2 arranged between these through holes. The length (dimension in the radial direction) of the first through holes 30 and second through holes 34 is greater than the length of the rollers 2, and the width (dimension in the circumferential direction) of the first through holes 30 and second through holes 34 is less than the outer diameter of the rollers 2. Therefore, when the cage 3a is formed by combining the first cage element 25 and second cage element 26, the rollers 2 are held between the first through holes 30 and second through holes 34 so as to be able to roll freely, and in a state of being prevented from falling out. In other words, the first through holes 30 and second though holes 34 are aligned to form pockets 6.

With the construction of this example described above, it is possible to both maintain the engagement amount between the outer circumferential edge of the cage 3a and the plurality of outer-diameter side locking sections 9a that are formed around the outer circumferential edge section of the first thrust race 4a, and to prevent rubbing between the outer circumferential edge of the cage 3a and the outer-diameter side locking sections 9a from occurring. In other words, in the case of the construction of this example, the height of the first outer-diameter side fitting cylindrical section 29, which is at the maximum outer diameter section of the cage 3a, is reduced, so the first outer-diameter side fitting cylindrical section 29 and the outer-diameter side locking sections 9a do not overlap in the radial direction. Therefore, during operation of the thrust roller bearing with races 1c, it is possible to prevent rubbing between the outer-diameter side locking sections 9a that are intermittently provided in the circumferential direction and the outer circumferential edge of the cage 3a, and thus it is possible to assure smooth rotation of the cage 3a, and to make it easy to stabilize the operating state of the thrust roller bearing with races 1c.

The construction and functions of the other parts of this example, except for the protrusions 19 (see FIG. 1 and FIG. 3) being omitted, is nearly the same as in the first example of an embodiment of the present invention, so any redundant explanation is omitted. In the construction of this example as well, it is possible to provide protrusions 19 around the outer circumferential edge of the second thrust race section 10b of the second thrust race 5b.

The cage that is used when embodying the present invention uses construction in which cage elements, which are obtained by bending metal plates, are combined to form a hollow ring shape. The metal plate that is used for forming these cage elements is, for example, carbon steel plate (for example, SPCC) having a thickness of about 0.4 mm and to which nitriding is performed to obtain a surface hardness of Hv 400 to Hv 850. However, it is also possible to use a cage that is formed by bending the pair of metal plates to entirely form a ring shape having a crank shape cross-section, or that is formed using synthetic resin (PA66, PA46, PPS and the like).

When using any of these cages, preferably, by making the thickness in the axial direction of the cage equal to or less than 80% the diameter of the rollers, it is possible to maintain the thickness of the ring-shaped space between both side surfaces in the axial direction of the cage and the first thrust race surface and second thrust race surface, and thus it is possible to maintain the amount of flow of lubricant. However, when the thickness in the axial direction of the cage is less than 50% the diameter of the rollers, engagement between the inside surfaces of the pockets formed in the cage and the rolling surfaces of the rollers becomes difficult (regulating the axial position of the cage by the rollers becomes difficult, and when regulated unreasonably, strong rubbing occurs between the inside surfaces of the pockets and the rolling surfaces of the rollers), so there is a good possibility that smooth rolling of the rollers will be impaired. Therefore, preferably the thickness in the axial direction of the cage is kept within the range of 50% to 80% the diameter of the rollers.

Moreover, by using a fired material such as SK85 having an carbon content (C %) of 0.5 to 1.0% by weight, or a carburized material such as SCM415 (C % of the raw material; C %=0.1 to 0.5% by weight) as the material of the first thrust race, partial curl processing becomes possible within the range of a first thrust race thickness of 0.6 mm to 2.0 mm. In the case of full curl processing, when the thickness exceeds 1.0 mm, it becomes difficult to process the outer-diameter side locking sections using low-cost pressing.

The material that can be used for the second thrust race is the same as that for the first thrust race. The thickness of the second thrust race can be within the range of 0.6 mm to 5.0 mm.

EXAMPLE

Figure 5:
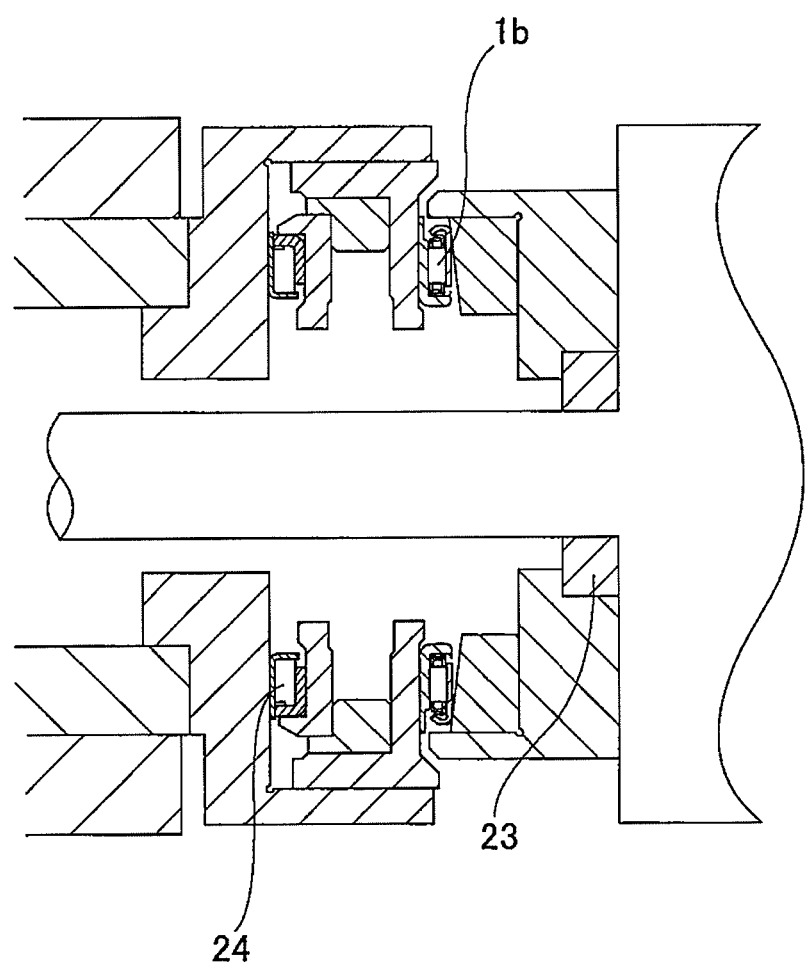
FIG. 5 is a cross-sectional drawing illustrating the condition when testing durability when the first thrust race and second thrust race are made to be eccentric.
Figure 6:
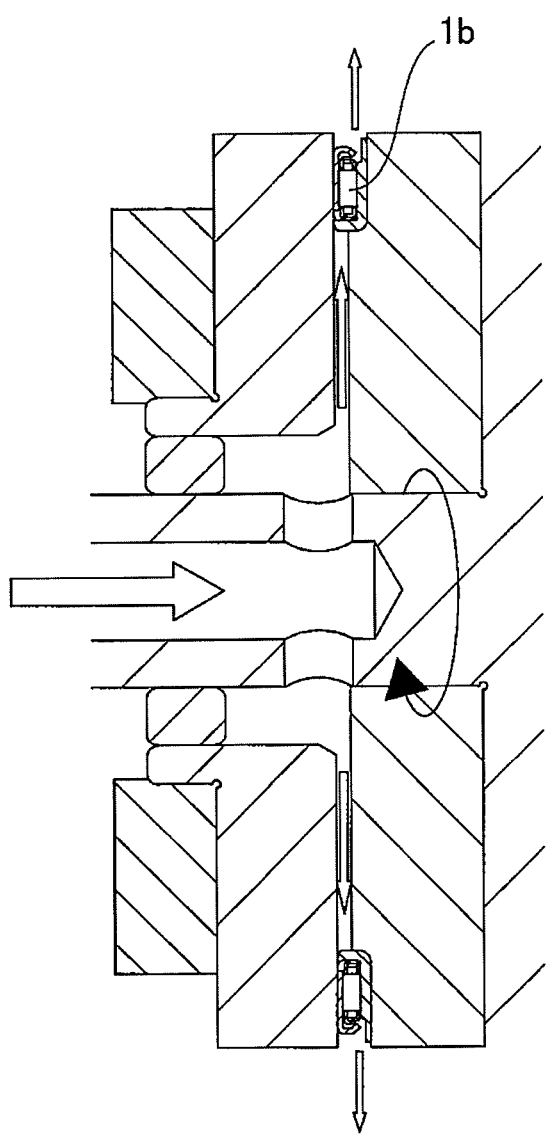
FIG. 6 is a cross-sectional drawing illustrating the condition when testing the flow rate of lubricant.

Testing that was performed to confirm the results of the present invention will be explained with reference to Table 1, Table 2, FIG. 5 and FIG. 6. Table 1 and FIG. 5 illustrate the test conditions and results for two kinds of tests: a test for learning the effect of the size of the internal gap of the thrust roller bearing with races on the durability when the first thrust race and second thrust race are operated in an eccentric state (eccentricity test), and a test for learning the effect of the size of the internal space of the thrust roller bearing with races on the durability when the state of the thrust load is alternately repeated between a loaded state and unloaded state (load ON/OFF test). Conditions that are common in these two tests are as given below.

Outer diameter of the thrust roller bearing with races: 85 mm

Inner diameter of the thrust roller bearing with races: 54 mm

Thickness in the axial direction of the thrust roller bearing with races (bearing width): 5.4 mm Test load (P/C): 0.4 (Fa=12600 N)

RPM (rotation on the first thrust race side): 6000 RPM ($min^{-1}$)

Lubrication condition: Soaking up to rotation center in ATF oil bath

Lubricant temperature: 120° C.

In the eccentricity test, the center axes of the first thrust race and the second thrust race are shifted 0.6 mm using an eccentric jig 23 as illustrated in FIG. 5.

Furthermore, in the load ON/OFF test, the test load was repeatedly applied every 2 seconds (4-second cycle) to the thrust roller bearing with races 1b by way of another thrust bearing 24, other than the thrust roller bearing with races 1b which is the test object. The first thrust race and second thrust race were concentric with each other.

In the test, while measuring the vibration that occurs in the thrust roller bearing with races 1b with a vibration meter, when the vibration became large so as to exceed a preset threshold value, it was determined that the life of the thrust roller bearing with races 1b was reached, so testing was stopped at that instant. In Table 1, together with the time when testing was stopped, "no passing" is indicated with an "x". Moreover, when the vibration did not increase after 60 hours of testing, the test was stopped at that instant, after which the thrust roller bearing with races 1b was disassembled, and whether or not there was damage to the cage, and whether or not there was damage such as flaking of the thrust race surfaces was visually checked, and when there was either kind of damage, the mark "x" was entered in Table 1 to indicate "no passing", and when there was neither kind of damage, the mark "O" was entered to indicated "passing".

TABLE 1

| | Protrusion Amount of Outer-Diameter Side Locking Sections (mm) | Internal Gap (mm) | Eccentricity Test Result (hr) | Load ON/OFF Test Result (hr) | Outer-Diameter Side Locking Sections and Notch Section Shape |
|---|---|---|---|---|---|
| Ex. 1 | 0.6 | 1.0 | 60 hr ○ | 60 hr ○ | Partial curl (trapezoidal) |
| Ex. 2 | 0.7 | 1.2 | 60 hr ○ | 60 hr ○ | Partial curl (trapezoidal) |
| Ex. 3 | 1.0 | 2.0 | 60 hr ○ | 60 hr ○ | Partial curl (trapezoidal) |
| Ex. 4 | 0.6 | 1.0 | 60 hr ○ | 60 hr ○ | Partial curl (circular) |
| Ex. 5 | 0.75 | 1.2 | 60 hr ○ | 60 hr ○ | Partial curl (circular) |
| Ex. 6 | 1.1 | 2.0 | 60 hr ○ | 60 hr ○ | Partial curl (circular) |

TABLE 1-continued

|  | Protrusion Amount of Outer-Diameter Side Locking Sections (mm) | Internal Gap (mm) | Eccentricity Test Result (hr) | Load ON/OFF Test Result (hr) | Outer-Diameter Side Locking Sections and Notch Section Shape |
|---|---|---|---|---|---|
| CE. 1 | 0.4 | 0.8 | 60 hr X | 60 hr ○ | Full curl |
| CE. 2 | 0.4 | 0.8 | 48 hr X | 60 r ○ | Partial curl (trapezoidal) |
| CE. 3 | 1.2 | 2.3 | 60 hr ○ | 25 hr X | Partial curl (trapezoidal) |
| CE. 4 | 0.35 | 0.8 | 47 hr X | 60 hr ○ | Partial curl (circular) |
| CE. 5 | 1.15 | 2.3 | 60 hr ○ | 24 hr X | Partial curl (circular) |
| CE. 6 | 0.25 | 0.6 | 23 hr X | 25 hr X | Normal tab |
| CE. 7 | 0.2 | 0.4 | 21 hr X | 26 hr X | Normal tab |

*) Ex.: Example, CE; Comparative Example

In Table 1, in all of the examples 1 to 6, the size of the internal gap was kept within the range of 1 mm to 2 mm, and even during operation under a large eccentricity of 0.6 mm, there was no damage to the cage and no damage such as flaking in any of the example even after reaching the calculated life of 60 hours. This is due to the effect of an internal gap of 1 mm or greater.

Moreover, in the load ON/OFF test, in a state with no thrust load (load OFF), the cage dropped under its own weight, and after that, in a loaded state (load ON), as the thrust roller bearing with races rotated, part in the circumferential direction of the cage was wedged between the inner circumferential surface of the outer-diameter side flange and the outer circumferential surface of the inner-diameter side flange. However, in this case as well, the wear to the cage is light, and even after reaching the calculated life of 60 hours, there was no damage to any parts of the thrust roller bearing with races that would be a particular problem. This is due to the effect of an internal gap of 2 mm or less.

On the other hand, in the comparative examples 1 to 7 where the size of the internal gap is outside the range (1 mm to 2 mm) of the present invention, the bearings did not pass in one or both the eccentricity test and load ON/OFF test. In other words, in comparison examples 1, 2, 4, 6 and 7, the internal gap was small, and wedging of the cage occurred in both tests. There were some bearings for which the test could be continued until 60 hours, however, after disassembling the thrust roller bearing with races and checking each of the parts, damage such as cracking or flaking had occurred.

From the tests results given in Table 1, it was confirmed that by regulating the internal gap to 1 mm to 2 mm, it is possible to obtain a thrust roller bearing with races having excellent durability.

Next, testing that was performed to learn the effects that the differences in the construction of thrust roller bearings with races have on the amount of flow of lubricant in a thrust roller bearing with races will be explained. The test conditions are as given below.

Outer diameter of the thrust roller bearing with races: 85 mm
Inner diameter of the thrust roller bearing with races: 54 mm
Thickness in the axial direction of the thrust roller bearing with races (bearing width): 5.4 mm
Test load (P/C): 0.05 (Fa=12600 N)
RPM (rotation on the second thrust race side):
   3 stages of 500 RPM ($m^{-1}$) 3000 RPM, and 5000 RPM
Lubrication condition: ATF is supplied from the inner-diameter side at a pressure of 5 kPa
Lubricant temperature: 100° C.
Thickness of the first thrust race: 0.8 mm
Thickness of the second thrust race: 1.6 mm The results of the testing performed under these conditions are given in Table 2. The construction of examples 1 to 6 and comparative examples 1 to 7 correspond with that in Table 1 and Table 2 (same specifications).

TABLE 2

| | First Thrust Race (mm) | | Second Thrust Race (mm) | | Amount of Flow of Lubricant (L/min) | | |
|---|---|---|---|---|---|---|---|
| | Number of Outer-Diameter Side Locking Sections | Depth of Notches | Number of Inner-Diameter Side Locking Sections | Height h of Stepped Section | 500 rpm | 3000 rpm | 5000 rpm |
| Ex. 1 | 3 | 2.0 | 4 | — | 2.1 | 4.0 | 7.2 |
| Ex. 2 | 3 | 2.0 | 4 | 0.6 | 3.4 | 5.5 | 9.0 |
| Ex. 3 | 4 | 2.0 | 4 | 0.8 | 3.5 | 5.9 | 10.0 |
| Ex. 4 | 3 | 2.0 | 3 | — | 2.0 | 4.2 | 7.0 |
| Ex. 5 | 3 | 1.5 | 3 | 0.6 | 2.9 | 5.1 | 8.0 |
| Ex. 6 | 4 | 1.5 | 3 | 0.8 | 3.0 | 5.5 | 9.5 |
| CE. 1 | — | 0.1 | 4 | — | 0.3 | 1.8 | 3.0 |
| CE. 2 | 4 | 2.0 | 4 | — | 0.7 | 2.0 | 3.3 |
| CE. 3 | 3 | 2.0 | 3 | — | 0.8 | 2.0 | 3.4 |
| CE. 4 | 4 | 1.5 | 4 | — | 0.6 | 1.9 | 3.2 |
| CE. 5 | 3 | 1.5 | 3 | — | 0.5 | 1.8 | 3.1 |
| CE. 6 | 4 | 1.0 | 4 | — | 0.5 | 1.8 | 3.2 |
| CE. 7 | 3 | 0.5 | 3 | — | 0.4 | 1.7 | 3.1 |

*) Ex.: Example, CE; Comparative Example

As can be clearly seen from the Table 2 of the results of the testing performed under the conditions described above, in all of the thrust race bearings with races of examples 1 to 6 that were within the technical scope of the present invention the amount of lubricant that passed through the internal space compared with the thrust roller bearings with races of the comparative examples that were outside of the technical scope of the present invention, could be maintained at two times or greater, regardless of the RPM.

As can be clearly seen from the results of the three kinds of tests that are given in Table 1 and Table 2, with the thrust roller bearings with races that are within the technical range of the present invention, construction could be achieved in which handling is good, and stable operation can be maintained even under extreme operating conditions.

The construction of comparative example 1 has full curl outer-diameter side locking sections, however, the internal gap is 0.8 mm, the amount of wedging was 0.2 mm, and testing was ended after 60 hours, however, upon checking the inside of the bearing, it was found that cracking of the cage had occurred. In the load ON/OFF test, there were no problems even after 60 hours. However, it can be seen that the amount of flow of the lubricant was small due to the narrow opening, and as the operating conditions become extreme, it becomes difficult to sufficiently maintain durability.

Moreover, in comparative examples 2 to 5, together with forming a plurality of outer-diameter side locking sections intermittently in the circumferential direction around the tip-end edge section of the outer-diameter side flanges, notches are formed between outer-diameter side locking sections that are adjacent in the circumferential direction, and further, by making the internal gap 0.8 mm or 2.3 mm, only comparative examples 2 and 5 did not pass in the eccentricity test. However, in comparative examples 3 and 5, the internal gap is very large, so in the load ON/OFF test, the amount that the cage dropped during no load (OFF) was large, and damage occurred to the cage during the test. Moreover, in comparative examples 2 and 4, in the eccentricity test, the cage was damaged due to wear of the outer circumferential edge section of the cage. In regards to the amount flow of lubricant, in comparative examples 2 to 7, the flow rate was increased compared to comparative example 1, however, was still less than in example 1 to 6. Of examples 1 to 6, in examples 2, 3, 5 and 6 in which the protrusion for preventing reverse assembly is made thin (i.e. a stepped section is formed), it was possible to further increase the amount of lubricant flow when compared with examples 1 and 4 in which the protrusion is not made particularly thin.

Figure 7:
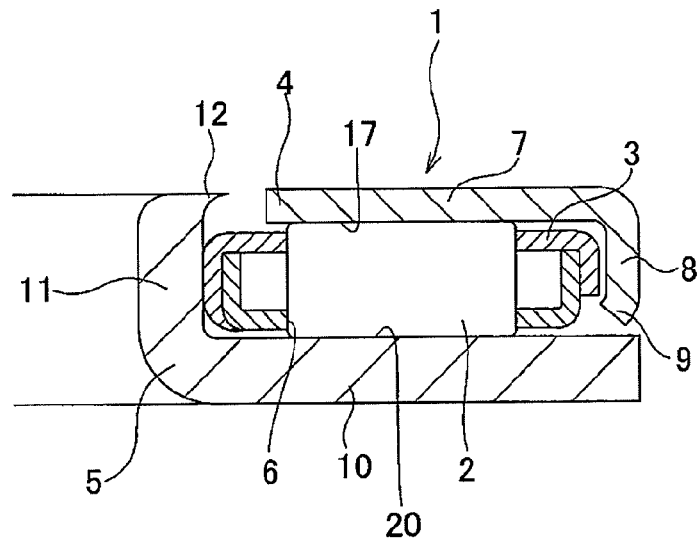
FIG. 7 is a partial cross-sectional drawing illustrating an example of a conventionally known thrust roller bearing with races.
Figure 8:
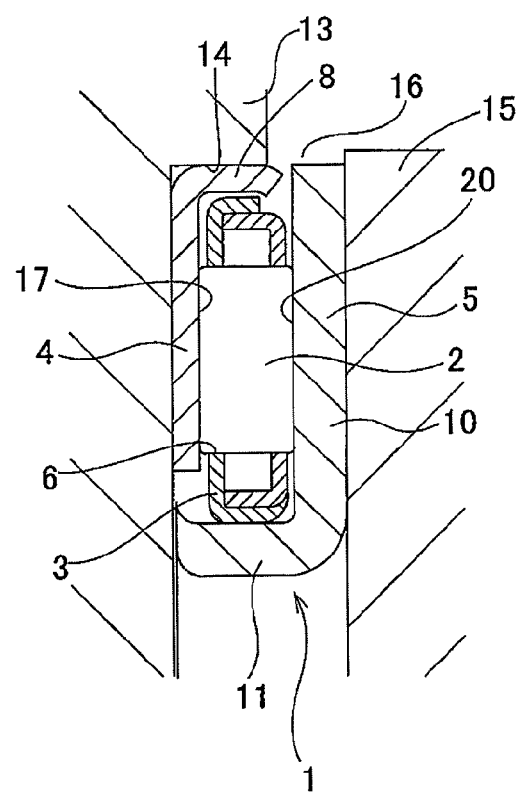
FIG. 8 is a partial cross-sectional drawing illustrating an example of the assembled state of the thrust roller bearing with races illustrated in FIG. 7.
Figure 9:
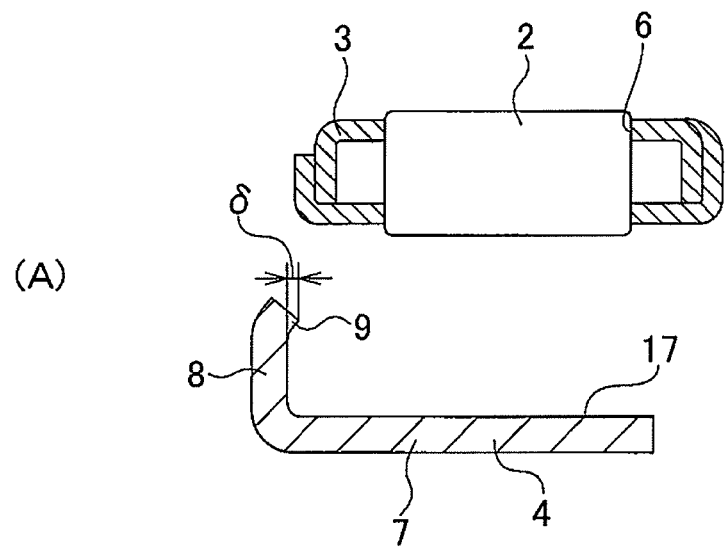
FIG. 9A to FIG. 9C are partial cross-sectional drawings illustrating the order of processing when combining the first thrust race and the cage that holds the rollers for the thrust roller bearing with races illustrated in FIG. 7.
Figure 9:
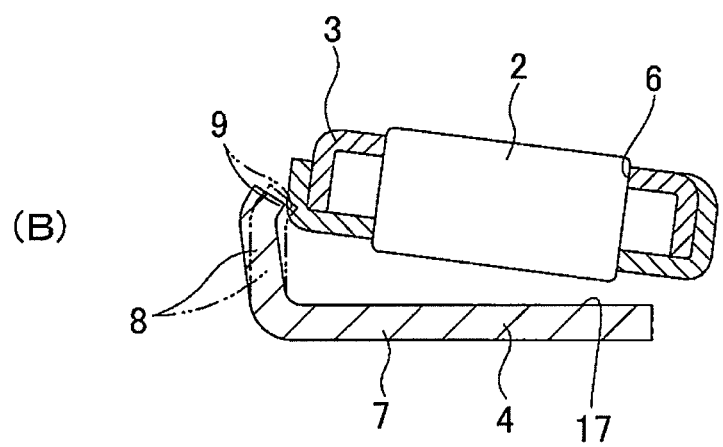
Figure 9:
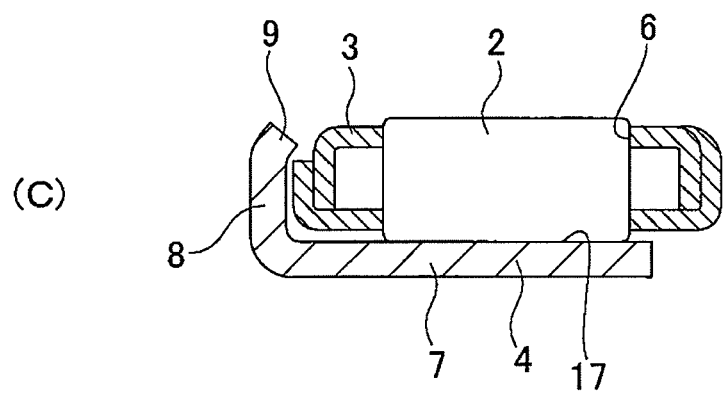

Furthermore, in comparative examples 6 and 7, normal tab construction such as is widely used conventionally and disclosed and illustrated in FIG. 1 and FIG. 2 of JP 2004-028342 (A) was used, however, as illustrated in FIG. 1 and FIG. 7, it is difficult to form outer-diameter side locking sections having a large amount of protrusion on the tip-end edge of the outer-diameter side flange of the thin first thrust race, and thus it is difficult to maintain the internal gap. In other words, in comparative examples 6 and 7, the internal gap is a small 0.6 mm and 0.4 mm, respectively, and in the eccentricity test, the cage was broken due to wear on the outer circumferential edge section of the cage during the test. Moreover, in the ON/OFF test as well, the cage was damaged during the test. Even in the normal tab construction, it is easy to maintain a large amount of protrusion on the tip-end edge of the inner-diameter side flange of the comparatively thick second thrust race. Therefore, even in the first example of an embodiment of the present invention illustrated in FIG. 1 and FIG. 3, normal tab construction is employed as the inner-diameter side locking sections 12a that are formed around the tip-end edge of the inner-diameter side flange 11a. Furthermore, in regards to the amount of lubricant flow, in comparative examples 6 and 7 as well, a tendency similar to that in comparative examples 1 to 5 was displayed.

INDUSTRIAL APPLICABILITY

The thrust roller bearing with races of the present invention is not limited to used in a transmission of an automobile, and can be used in the rotational support section of all kinds of rotary machinery such as agriculture machinery, construction machinery, steel machinery, supplementary machinery for an engine such as a compressor and the like.

EXPLANATION OF REFERENCE NUMBERS 1, 1a, 1b, 1c Thrust roller bearing with races
2 Roller
3, 3a Cage
4, 4a First thrust race
5, 5a, 5b Second thrust race
6 Pocket
7, 7a First race thrust section
8, 8a Outer-diameter side flange
9, 9a Outer-diameter side locking section
10, 10a, 10b Second thrust race section
11, 11a Inner-diameter side flange
12, 12a Inner-diameter side locking section
13 Casing
14 Cage
15 Opposing member
16 Gap
17 First thrust race surface
18 Notch
19 Protrusion
20 Second thrust race surface
21 Notch
22 Stepped section
23 Eccentric jig
24 Thrust bearing
25 First cage element
26 Second cage element
27 First flat plate section
28 First inner-diameter side fitting cylindrical section
29 First outer-diameter side fitting cylindrical section
30 First through hole
31 Second flat plate section
32 Second inner-diameter side fitting cylindrical section
33 Second outer-diameter side fitting cylindrical section
34 Second through hole
35 Base half section
36 tip-end half section

What is claimed is:

1. A thrust roller bearing with races, comprising:
a circular ring-shaped cage having pockets that are long in the radial direction formed at a plurality of locations in the circumferential direction;
a plurality of rollers that are arranged in the pockets so as to be able to roll freely; and
a first thrust race and second thrust race that are combined so as to be able to rotate relative to the cage and so as not to be able to separate; the first thrust race which is formed by bending a hard metal plate comprising:
a first thrust race section that has a flat circular ring shape;
a cylindrical outer-diameter side flange that is formed by bending the outer circumferential edge of the first thrust race toward one side in the axial direction; and
outer-diameter side locking sections that are formed at a plurality of locations in the circumferential direction of the tip-end edge of the outer-diameter side flange, and protrude toward the inside in the radial direction from the tip-end edge of the outer-diameter side flange;
in which the height dimension in the axial direction of the outer-diameter side flange in portions where the outer-diameter side locking sections are not formed is less than portions where the outer-diameter side locking sections are formed, and the outer diameter of the outer-diameter side flange is 60 mm to 120 mm, the second thrust race which is formed by bending a hard metal plate comprising:
a second thrust race section that has a flat circular ring shape;
a cylindrical inner-diameter side flange that is formed by bending the inner circumferential edge of the second thrust race toward one side in the axial direction; and
inner-diameter side locking sections that are formed at a plurality of locations in the circumferential direction of the tip-end edge of the inner-diameter side flange, and protrude toward the outside in the radial direction from the tip-end edge of the inner-diameter side flange;
in which the inner diameter of the inner-diameter side flange is 40 mm to 80 mm; and
in case that, with the outer-diameter side flange, the inner-diameter side flange and the cage concentrically arranged, the sum of the dimensions in the radial direction of the ring-shaped gaps that exist between the inner circumferential surface of the outer-diameter side flange and the outer circumferential surface of the cage and between the outer circumferential surface of the inner-diameter side flange and the inner circumferential surface of the cage is taken to be an internal gap inside the thrust roller bearing with races, this internal gap being within the range of 1 mm to 2 mm.

2. The thrust roller bearing with races according to claim 1, wherein
the cage is entirely formed into a hollow ring shape by combining together a first cage element and second cage element;
the first cage element, which is located on the first thrust race section side, is formed by forming a first inner-diameter side fitting cylindrical section and first outer-diameter side fitting cylindrical section that are bent at a right angles in the same axial direction as each other from both the inner and outer circumferential edges of a circular ring-shaped first flat plate section;
the second cage element, which is located on the second thrust race section side, is formed by forming a second inner-diameter side fitting cylindrical section and second outer-diameter side fitting cylindrical section that are bent at a right angles in the same axial direction as each other from both the inner and outer circumferential edges of a circular ring-shaped second flat plate section; and
the first cage element and second cage element are combined together by fitting the first inner-diameter side fitting cylindrical section into the second inner-diameter side fitting cylindrical section, and fitting the first outer-diameter side fitting cylindrical section onto the second outer-diameter side fitting cylindrical section; the diameter of the second outer-diameter side fitting cylindrical section being larger on the tip-end half section that is on the far side from the second flat plate section than on the base half section that is near the second flat plate section, and the first outer-diameter side fitting cylindrical section fitting onto the tip-end half section of the second outer-diameter side fitting cylindrical section.

3. The thrust roller bearing with races according to claim 1, wherein
the second thrust race has a circular-ring shaped second thrust race section and at least one protrusion that is formed so as to protrude outward in the radial direction from part of the outer circumferential edge of the second thrust race section; the outer diameter of the second thrust race section being less than the inner diameter of the outer-diameter side flange, and the diameter of the circumscribed circle of the second thrust race that includes the protrusions being larger than the outer diameter of the outer-diameter side flange.

4. The thrust roller bearing with races according to claim 3, wherein
the thickness dimension of the protrusions is less than the thickness dimension of the second thrust race section, and a stepped section is formed at the boundary section between one surface of the protrusions that faces the tip-end edge of the outer-diameter side flange and the race surface of the second thrust race section that comes in rolling contact with the rollers.

5. The thrust roller bearing with races according to claim 4, wherein
the protrusions are formed at a plurality of locations that are evenly spaced around the outer circumferential edge of the second thrust race section.

* * * * *